United States Patent
Sasa

(10) Patent No.: US 7,119,130 B2
(45) Date of Patent: *Oct. 10, 2006

(54) ACTINIC RAY CURABLE INK-JET INK AND PRINTED MATTER

(75) Inventor: Nobumasa Sasa, Sayama (JP)

(73) Assignee: Konica Minolta Medical & Graphic Inc., Tokyo (JP)

(*) Notice: Subject to any disclaimer, the term of this patent is extended or adjusted under 35 U.S.C. 154(b) by 6 days.

This patent is subject to a terminal disclaimer.

(21) Appl. No.: 10/888,717

(22) Filed: Jul. 9, 2004

(65) Prior Publication Data

US 2005/0020717 A1   Jan. 27, 2005

(30) Foreign Application Priority Data

Jul. 22, 2003   (JP) .............................. 2003-199560

(51) Int. Cl.
*C08F 2/46* (2006.01)

(52) U.S. Cl. ..................... 522/170; 522/100; 522/168; 522/81; 522/71; 522/74; 522/181; 428/411.1; 428/413

(58) Field of Classification Search ............... 522/100, 522/168, 170, 818, 74, 81, 71; 428/411.1, 428/413

See application file for complete search history.

(56) References Cited

U.S. PATENT DOCUMENTS

| | | | |
|---|---|---|---|
| 5,061,551 A | | 10/1991 | Durand |
| 5,641,346 A | * | 6/1997 | Mantell et al. .......... 106/31.58 |
| 5,889,084 A | * | 3/1999 | Roth ........................ 523/161 |
| 6,166,100 A | | 12/2000 | Hiwara et al. |
| 6,805,439 B1 | * | 10/2004 | Maeda et al. .................. 347/96 |
| 2002/0035199 A1 | | 3/2002 | Breunig et al. |
| 2002/0068772 A1 | | 6/2002 | Laksin et al. |
| 2004/0019128 A1 | * | 1/2004 | Kondo ....................... 522/167 |
| 2004/0201659 A1 | * | 10/2004 | Watanabe ................... 347/100 |
| 2004/0244641 A1 | * | 12/2004 | Takabayashi et al. ..... 106/31.27 |

FOREIGN PATENT DOCUMENTS

| | | |
|---|---|---|
| EP | 1 357 159 A2 | 10/2003 |
| EP | 04 25 4310 | 10/2004 |
| WO | WO 03/099947 A1 | 12/2003 |

* cited by examiner

Primary Examiner—Sanza L. McClendon
(74) Attorney, Agent, or Firm—Lucas & Mercanti, LLP

(57) ABSTRACT

Disclosed is an actinic ray curable ink-jet ink comprising a an epoxy compound having at least two oxirane rings and a linkage chain linking the two oxirane rings, wherein the linkage chain has a branched structure.

9 Claims, No Drawings

ACTINIC RAY CURABLE INK-JET INK AND PRINTED MATTER

FIELD OF THE INVENTION

The present invention relates to an actinic ray curable ink-jet ink and a printed material using the same.

BACKGROUND OF THE INVENTION

Up to now, as an ink-jet ink exhibiting good water resistance, there has been an ink which contains a water soluble dye dispersed or dissolved in a high boiling point solvent, and which contains a water soluble dye dissolved in a volatile solvent. However, a dye is inferior to a pigment in resistance characteristics such as light stability, and therefore ink using a pigment as a coloring agent has been required. But, it is difficult to disperse a pigment stably in an organic solvent, and it is also difficult to ensure stable dispersibility and ejection. On the other hand, in cases when ink using a high boiling solvent is applied onto a non-absorptive recording medium, a solvent in the ink is not volatized, results in difficulty of drying via evaporation of the solvent. Accordingly, ink using high boiling solvent cannot be printed on a non-absorptive recording medium.

Generally, ink using a volatile organic solvent can be properly printed onto a non-absorptive recording medium, due to adhesiveness of resin used and volatilization of the solvent. However, such ink, in which the volatile solvent is a major component, is easily dried at the nozzles of a recording head due to volatilization of the solvent, requiring frequent maintenance. Resistance of ink to some solvents may not be sufficient because the ink essentially requires good solubility in a solvent used.

Further, in an on-demand printer using a piezo element, usage of a large amount of a volatile solvent in ink increases frequency of maintenance, and also tends to cause problems of dissolution and swelling of members contacting the ink in the printer. In addition, a volatile solvent has numerous restrictions as a dangerous material under the Fire Defense Law. Consequently, in an on-demand printer using a piezo element, it is necessary to employ ink containing a volatile solvent in a small amount. However, components used in an actinic ray curable ink usually are ones having a relatively high viscosity. Therefore, it has been difficult to design ink having a viscosity capable of being ejected in conventional printers and further having good curability and high stability.

In order to overcome the problems described above, an actinic ray curable composition is disclosed in Japanese Patent O.P.I. Publication No. 2001-220526) which contains an epoxy compound, and a compound having an oxetane ring or a vinyl ether. Extensive study of the above actinic ray curable composition has been made, and, as a result, it has been proven that ink of this composition has problems in strength of a cured layer therefrom, ejection stability from nozzles, its adhesion to a recording medium, solvent resistance, and water resistance as well as in safety, stability, and curability under high humidity. Solution of the above problems has been desired.

SUMMARY OF THE INVENTION

The present invention has been made in view of the above.

An object of the invention is to provide an actinic ray curable ink-jet ink providing high safety, good stability, excellent photopolymerization properties under high humidity, good curability, high strength of the cured ink layer, excellent stability of ejection from nozzles, good adhesion to a substrate, good solvent resistance, and good water resistance, thus providing printed matter prepared by employing the actinic ray curable ink-jet ink.

Another object of the invention is to provide an epoxy compound with high safety and good stability, and to provide an actinic ray curable composition containing the epoxy compound.

DETAILED DESCRIPTION OF THE INVENTION

The above object of the present invention is achieved by the following:

1. An actinic ray curable ink-jet ink comprising an epoxy compound having at least two oxirane rings and a linkage chain linking the two oxirane rings, wherein the linkage chain has a branched structure.

2. The actinic ray curable ink-jet ink of item 1 above, wherein the linkage chain has at least two ester groups.

3. The actinic ray curable ink-jet ink of item 1 above, wherein the epoxy compound is an alicyclic epoxy compound represented by the following formula (VI) or (VII),

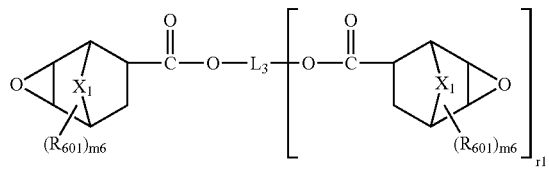

Formula (VI)

wherein $R_{601}$ represents an aliphatic group which is positioned at the position other than the α, β-position of the oxirane rings; m6 represents an integer of from 0 to 2; $X_1$ represents $-(CH_2)_{n6}-$ or $-(O)_{n6}-$, in which n6 represents an integer of 0 or 1; r1 represents an integer of from 1 to 3; and $L_3$ represents a (r1+1)-valent linkage group having a branched structure, provided that the linkage group may contain an oxygen atom or a sulfur atom in the main chain,

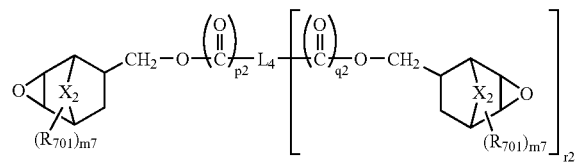

Formula (VII)

wherein $R_{701}$ represents an aliphatic group which is positioned at the position other than the α, β-position of the oxirane rings; m7 represents an integer of from 0 to 2; $X_2$ represents $-(CH_2)_{n7}-$ or $-(O)_{n7}-$ in which n7 represents an integer of 0 or 1; r2 represents an integer of from 1 to 3; $L_4$ represents a (r2+1)-valent linkage group having a branched structure, provided that the linkage group may contain an oxygen atom or a sulfur atom in the main chain; and p2 and q2 independently represent an integer of 1 or 2.

4. The actinic ray curable ink-jet ink of item 1 above, wherein the epoxy compound has a molecular weight of from 170 to 1,000.

5. The actinic ray curable ink-jet ink of item 1 above, further comprising an oxetane ring-containing compound or a vinyl ether compound.

6. The actinic ray curable ink-jet ink of item 1 above, further comprising a cationic photopolymerization initiator.

7. The actinic ray curable ink-jet ink of item 1 above, further comprising pigment.

8. The actinic ray curable ink-jet ink of item 7 above, further comprising a pigment dispersant.

9. The actinic ray curable ink-jet ink of item 7 above, wherein the pigment has an average particle size of from 10 to 150 nm.

10. The actinic ray curable ink-jet ink of item 1 above, wherein the ink has a viscosity at 25° C. of 5 to 50 Pa·s.

11. A printed matter, prepared by supplying the actinic ray curable ink-jet ink of item 1 above onto a recording medium.

Next, the present invention will be explained in detail.

The actinic ray curable ink-jet ink of the invention is characterized in that it comprises an epoxy compound (hereinafter referred to as the epoxy compound in the invention) having a specific structure. It is preferred that the actinic ray curable ink-jet ink of the invention comprises an oxetane ring-containing compound, a vinyl ether compound, a cationic photopolymerization initiator, pigment or a pigment dispersant. The pigment has an average particle size of preferably from 10 to 150 nm. The actinic ray curable ink-jet ink of the invention has a viscosity at 25° C. of preferably from 5 to 50 Pa·s. The printed matter of the invention is characterized in that it is prepared by supplying, onto a recording medium, the actinic ray curable ink-jet ink of the invention.

As a pigment contained in the actinic ray curable ink-jet ink of the invention (hereinafter also referred to as simply the ink-jet ink of the invention) usable are inorganic achromatic pigments such as carbon black, titanium oxide and potassium carbonate or organic chromatic pigments. Examples of the organic pigments include insoluble azo pigments such as Toluidine Red, Toluidine Maroon, Hanza Yellow, Benzidine Yellow, and Pyrazolone Red; soluble azo pigments such as Lithol Red, Helio Bordeaux, Pigment Scarlet, and Permanent Red 2B; derivatives derived from vat dyes such as Alizarine, indanthrone, and Thioindigo maroon; phthalocyanine organic pigments such as Phthalocyanine Blue and Phthalocyanine Green; quinacridone organic pigments such as Quinacridone Red and Quinacridone Magenta; perylene organic pigments such as Perylene Red and Perylene Scarlet; isoindolinone organic pigments such as Isoindolinone Yellow and Isoindolinone Orange; pyranthrone organic pigments such as Pyranthrone Red and Pyranthrone Orange; thioindigo organic pigments; condensed azo organic pigments; benzimidazolone organic pigments; quinophtharone organic pigments such as Quinophthalone Yellow; isoindolin organic pigments such as Isoindolin Yellow; and other pigments such as flavanthrone yellow, acylamide yellow, nickel azo yellow, copper azomethine yellow, perynone orange, anthrone orange, dianthraquinonyl red, and dioxazine violet.

Examples of the organic pigments, represented by the Color Index (C.I.) number, include C.I. Pigment Yellow 12, 13, 14, 17, 20, 24, 74, 83, 86, 93, 109, 110, 117, 125, 128, 129, 137, 138, 139, 147, 148, 150, 151, 153, 154, 155, 166, 168, 180, and 185; C.I. Pigment Orange 16, 36, 43, 51, 55, 59, and 61; C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

Of the foregoing pigments, quinacridone organic pigments, phthalocyanine organic pigments, benzimidazolone organic pigments, isoindolinone organic pigments, condensed azo organic pigments, quinophthalone organic pigments, and isoindolin organic pigments are preferred in view of light fastness. The organic pigments are preferably pigment particles having an average particle diameter of from 10 to 150 nm, which is determined utilizing a laser scattering method. Pigments having an average particle diameter less than 10 nm lowers the light fastness due to the excessively small particle diameter. On the other hand, pigments having an average diameter exceeding 150 nm lowers dispersion stability in the dispersion solution, whereby the pigments tend to precipitate.

Minute-sized organic pigments can be prepared, employing the method described below. Namely, a clayey mixture, comprising at least three components of an organic pigment, a water-soluble inorganic salt in a factor of at least 3 by weight of the organic pigment, and a water miscible solvent, is sufficiently kneaded to result in minute particles, employing a kneader and the like. Thereafter, the resulting mixture is poured in water and stirred employing a high speed mixer to prepare a slurry. The resulting slurry is repeatedly filtered and washed with water, whereby the water soluble salt and the water miscible solvent are removed. During preparation of the minute-sized organic pigments, resins and pigment dispersing agents can be added. Listed as the water soluble inorganic salt are sodium chloride and potassium chloride. The inorganic salt is used in an-amount 3 or more times the weight of the organic pigment used, and preferably in an amount 20 or less times the weight of the organic pigment used. When the weight of the inorganic salt is less than 3 times the organic pigment, it is impossible to prepare pigment particles of the desired particle size. On the other hand, when the weight of the inorganic salt is more than 20 times the organic pigment, excessively high load is imposed on the washing process as a post-process, resulting in substantial reduction of the processed amount of the organic pigments.

Use of the water miscible solvent provides a mixture in a clayey state, which contains pigment and a water soluble inorganic salt used as a crushing aid, and eases efficient crushing. The water miscible solvent is not specifically limited as long as it is miscible in water. However, temperature of the mixture elevates during kneading, and the solvent in the mixture tends to vaporize. Therefore, from the viewpoint of safety, a high boiling point solvent having a boiling point of from 120 to 250° C. is preferably used. Examples of the water miscible solvent include 2-(methoxymethoxy) ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and a low molecular weight polypropylene glycol.

In the present invention, the pigment is incorporated in the ink-jet ink in an amount of preferably from 3 to 15% by weight, in order to obtain a high image density and sufficient light fastness.

The epoxy compound in the invention has at least two oxirane rings and a linkage chain connecting the two oxirane rings, wherein the linkage chain has a branched structure. The linkage chain of the epoxy compound in the invention preferably has at least two ester groups. It is preferred that the epoxy compound in the invention is an alicyclic epoxy compound represented by formula (VI) or (VII) above.

Next, an alicyclic epoxy compound represented by formula (VI) or (VII) will be explained.

In formula (VI) or (VII), $R_{601}$, and $R_{701}$ independently represent an aliphatic group which is positioned at the position other than α or β-position of the oxirane rings. Examples of the aliphatic group include an alkyl group having a carbon atom number of from 1 to 6 (for example, a methyl group, an ethyl group, a propyl group, an isopropyl group, or a butyl group); a cycloalkyl group having a carbon number of from 3 to 6 (for example, a cyclopropyl group, a cyclobutyl group, a cyclopentyl group, or a cyclohexyl group); an alkenyl group having a carbon atom number of from 2 to 6 (for example, a vinyl group, a 1-propenyl group, a 2-propenyl group, or a 2-butenyl group); and an alkinyl group having a carbon atom number of from 2 to 6 (for example, an acetylenyl group, a 1-propinyl group, a 2-propinyl group, or a 2-butinyl group). The aliphatic group is preferably an alkyl group having a carbon atom number of from 1 to 3, and more preferably a methyl group or an ethyl group.

"m6" and "m7" independently represent an integer of from 0 to 2, and preferably not less than 1.

$X_1$ represents —$(CH_2)_{n6}$— or —$(O)_{n6}$—, and $X_2$ represents —$(CH_2)_{n7}$— or —$(O)_{n7}$—, in which n6 and n7 independently represent an integer of 0 or 1, provided that when n6 and n7 are 0, respectively, neither $X_1$ nor $X_2$ exists.

"m6" is an integer of from 0 to 2, and "m7" is an integer of from 0 to 2. It is preferred that (m6+n6) is not less than 1, or (m7+n7) is not less than 1.

"p2" and "q2" independently represent an integer of 1 or 2.

$L_3$ represents a (r1+1)-valent linkage group having a branched structure, provided that the linkage group may contain an oxygen atom or a sulfur atom in the main chain; and $L_4$ represents a (r2+1)-valent linkage group having a branched structure, provided that the linkage group may contain an oxygen atom or a sulfur atom in the main chain. "r1" and "r2" independently represent an integer-of from 1 to 3.

Herein, as divalent linkage groups with a carbon number of from 1 to 15 which may contain an oxygen atom or a sulfur atom in the main chain, are cited the following groups and their combination with —O—, —S—, —CO— and/or —CS—.

an ethylidene group [>CHCH$_3$],
an isopropylidene group [>C (CH$_3$)$_2$],
a 2,2-dimethyl-1,3-propanediyl group [—CH$_2$C(CH$_3$)$_2$CH$_2$—],
a 2,2-dimethoxy-1,3-propanediyl group [—CH$_2$C(OCH$_3$)$_2$CH$_2$—],
a 2,2-dimethoxymethyl-1,3-propanediyl group [—CH$_2$C(CH$_2$OCH$_3$)$_2$CH$_2$—],
a 1,3-dimethyl-2-oxa-1,4-butanediyl group [—CH(CH$_3$)CH$_2$OCH(CH$_3$)CH$_2$—],
a 1,4-dimethyl-3-oxa-1,5-pentanediyl group [—CH(CH$_3$)CH$_2$CH$_2$OCH(CH$_3$)CH$_2$—],
a 1,3,5-trimethyl-2,4-dioxa-1,6-hexanediyl group [—CH(CH$_3$)CH$_2$OCH(CH$_3$)CH$_2$OCH(CH$_3$)CH$_2$—],
a 4,4-dimethyl-2,5-dioxa-1,7-heptanediyl group [—CH$_2$CH$_2$OCH$_2$C(CH$_3$)$_2$CH$_2$OCH$_2$CH$_2$—],
a 4,4-dimethoxy-2,5-dioxa-1,7-heptanediyl group [—CH$_2$CH$_2$OCH$_2$C(OCH$_3$)$_2$CH$_2$OCH$_2$CH$_2$—],
a 4,4-dimethoxymethyl-2,5-dioxa-1,7-heptanediyl group [—CH$_2$CH$_2$OCH$_2$C(CH$_2$OCH$_3$)$_2$CH$_2$OCH$_2$CH$_2$—],
a 1,4,7-trimethyl-3,6-dioxa-1,8-octanediyl group [—CH(CH$_3$)CH$_2$CH$_2$OCH(CH$_3$)CH$_2$CH$_2$OCH(CH$_3$)CH$_2$—],
a 5,5-dimethyl-3,7-dioxa-1,9-nonanediyl group [—CH$_2$CH$_2$OCH$_2$CH$_2$C(CH$_3$)$_2$CH$_2$CH$_2$OCH$_2$CH$_2$—],
a 5,5-dimethoxy-3,7-dioxa-1,9-nonanediyl group [—CH$_2$CH$_2$OCH$_2$CH$_2$C(OCH$_3$)$_2$CH$_2$CH$_2$OCH$_2$CH$_2$—],
a 5,5-dimethoxymethyl-3,7-dioxa-1,9-nonanediyl group [—CH$_2$CH$_2$OCH$_2$CH$_2$C(CH$_2$OCH$_3$)$_2$CH$_2$CH$_2$OCH$_2$CH$_2$—],
an isopropylidene-p-phenylene group [-p-C$_6$H$_4$—C(CH$_3$)$_2$-p-C$_6$H$_4$—]

As tri- or more-valent linkage groups are cited groups in which an arbitrary hydrogen atom is withdrawn from the divalent linkage groups described above.

$L_3$ and $L_4$ may have a substituent. Examples of the substituent include a halogen atom (for example, a chlorine atom, a bromine atom, or a fluorine atom), an alkyl group having a carbon atom number of from 1 to 6 (for example, a methyl group, an ethyl group, a propyl group, an isopropyl group, or a butyl group), an alkoxy group having a carbon atom number of from 1 to 6 (for example, a methoxy group, an ethoxy group, an n-propoxy group, an isopropoxy group, a n-butoxy group or a tert-butoxy group), an acyl group (for example, an acetyl group, a propionyl group, or a trifluoroacetyl group), an acyloxy group (for example, an acetoxy group, a propionyloxy group, or a trifluoroacetoxy group), and an alkoxycarbonyl group (for example, a methoxycarbonyl group, an ethoxycarbonyl group, or a tert-butoxycarbonyl group). Preferred substituents are a halogen atom, an alkyl group, and an alkoxy group. $R_{405}$ and the substituent of $L_1$ and $R_{405}$ may combine with each other to form a ring.

Exemplified compounds of the epoxy compound in the invention (including the alicyclic epoxy compound represented by formula (VI) or (VII) above) will be listed, but the invention is not limited thereto.

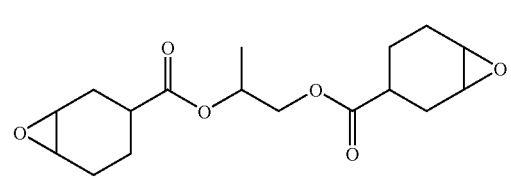

EP-1

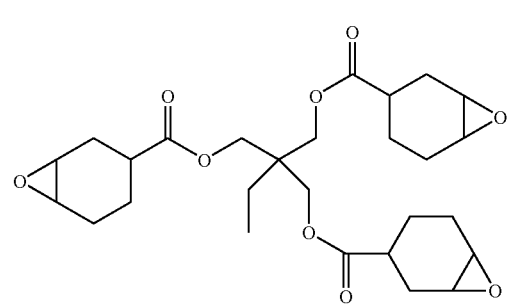

EP-2

-continued

EP-3
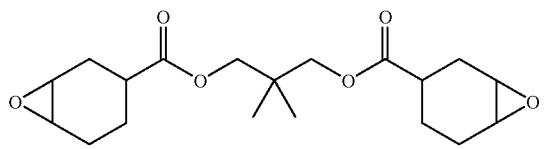

EP-4
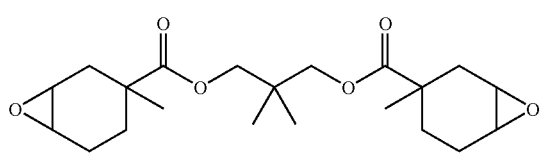

EP-5
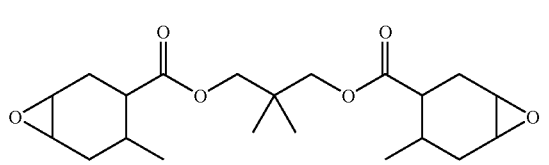

EP-6
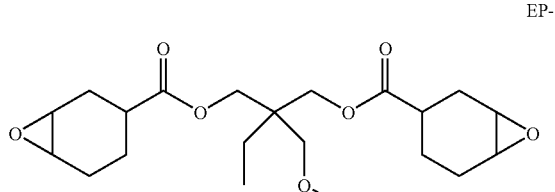

EP-7
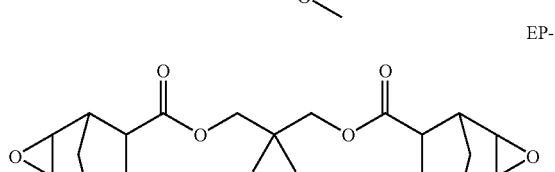

EP-8
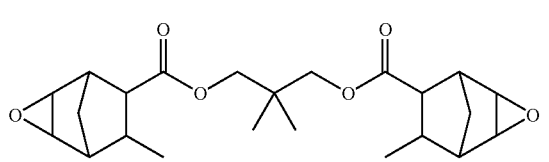

EP-9
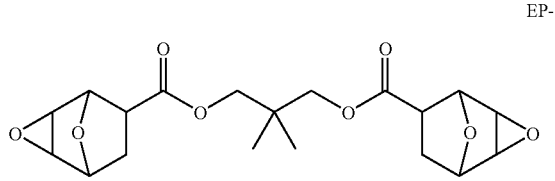

A synthetic method of the epoxy compound in the invention is not specifically limited. The epoxy compound can be synthesized according to the methods described in for example, "Jiken Kagaku Koza 20, Yukigosei II", 213- (1992), Fourth Edition, published by Maruzen K K Shuppan; Ed. by Alfred Hasfner, "The chemistry of heterocyclic compounds-Small Ring Heterocycles part 3 Oxiranes", John and Wiley and Sons, An Interscience Publication, New York (1985); Yoshimura, "Secchaku", Vol. 29, 12, pp. 32 (1985); Yoshimura, "Secchaku", Vol. 30, 5, pp. 42 (1986); Yoshimura, "Secchaku", Vol. 30, 7, pp. 42 (1986); Japanese Patent O.P.I. Publication No. 11-100378, Japanese Patent Application Nos. 2-140732 and 2-182124.

The epoxy compound in the invention has a molecular weight of preferably from 170 to 1,000, and more preferably from 300 to 700. An epoxy compound with a molecular weight less than 170 may be poor in safety, while an epoxy compound with a molecular weight exceeding 1,000 increases viscosity and ink-jet ink comprising that epoxy compound may result in poor stability of ejection from nozzles.

The content of the epoxy compound in the invention in the ink-jet ink of the invention is preferably from 5 to 70% by weight, and more preferably from 10 to 50% by weight.

The oxetane ring-containing compound used in the invention (hereinafter also referred to as oxetane compound) is a compound having one or more oxetane rings in the molecule. Typical examples of the oxetane compound include 3-ethyl-3-hydroxymethyloxetane (OXT101, etc.), 1,4-bis[(3-ethyl-3-oxetanyl)-methoxymethyl]benzene (OXT 121 etc.), 3-ethyl-3-(phenoxymethyl)oxetane (OXT 211 etc.), di(1-ethyl-3-oxetanyl)methyl ether (OXT 221 etc.), and.), and 3-ethyl-3-(2-ethylhexyloxymethyl)oxetane (OXT 212 etc.), each produced by Toa Gosei Co., Ltd. Especially preferred are 3-ethyl-3-hydroxymethyloxetane, 3-ethyl-3-(phenoxymethyl)oxetane and di(1-ethyl-3-oxetanyl)methyl ether. These can be used singly or as a mixture of two or more thereof.

The content of the oxetane ring-containing compound in the invention in the ink-jet ink of the invention is preferably from 30 to 90% by weight, and more preferably from 50 to 80% by weight.

In the ink-jet ink of the invention, an oxirane ring-containing compound other then the epoxy compound in the invention can be used in combination. The oxirane ring-containing compound is a compound containing in the molecule one or more oxirane rings represented by the following formula:

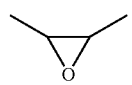

Generally, a monomer, oligomer or polymer each having an oxirane ring can be used as an epoxy resin. Examples thereof include known aromatic epoxides, alicyclic epoxides, and aliphatic epoxides. Hereinafter, "epoxide" implies a monomer or an oligomer. These compounds may be used singly or in combination.

A preferable aromatic epoxide is a di- or poly-glycidyl ether manufactured by a reaction of polyhydric phenol having at least one aromatic ring or of an alkylene oxide adduct thereof with epichlorohydrin, and includes, for example, such as di- or poly-glycidyl ether of bisphenol A or of an alkylene oxide adduct thereof, di- or poly-glycidyl ether of hydrogenated bisphenol A or of an alkylene oxide adduct thereof and novolac type epoxy resin. Herein, alkylene oxide includes such as ethylene oxide and propylene oxide.

An alicyclic epoxide is preferably a compound containing cyclohexene oxide or cyclopentene oxide obtained by epoxydizing a compound having at least one cycloalkane ring such as cyclohexene or cyclopentene by use of a suitable oxidizing agent such as hydrogen peroxide or a peracid. Examples of the alicyclic epoxide include celloxide 2021, celloxide 2021A, celloxide 2021P, celloxide 2080, celloxide 2000, Epolead GT301, Epolead GT302, Epolead GT401, Epolead GT403, EHPE-3150, EHPEL-3150, each produced by Daicel Kagaku Kogyo Co., Ltd.; and UVR-6105, UVR-6110, UVR-6128, UVR-6100, UVR-6216, UVR-6000, each produced by Union Carbide Co., Ltd.

A preferable aliphatic epoxide is such as di- or polyglycidyl ether of aliphatic polyhydric alcohol or of an alkylene oxide adduct thereof; the typical examples include diglycidyl ether of alkylene glycol, such as diglycidyl ether of ethylene glycol, diglycidyl ether of propylene glycol and diglycidyl ether of 1,6-hexane diol; polyglycidyl ether of polyhydric alcohol such as di- or triglycidyl ether of glycerin or of an alkylene oxide adduct thereof; and diglycidyl ether of polyalkylene glycol such as diglycidyl ether of polyethylene glycol or of an alkylene oxide adduct thereof and diglycidyl ether of polypropylene glycol or of an alkylene oxide adduct thereof. Herein, alkylene oxide includes such as ethylene oxide and propylene oxide.

Besides the compounds described above, monogycidyl ethers of higher aliphatic alcohols, phenol or cresol can be used. Among these epoxides, the aromatic epoxide and alicyclic epoxide are preferable and the alicyclic epoxide is specifically preferable, taking a quick curing property in consideration.

These oxirane ring-containing compounds are contained in an amount of 0 to 50% by weight, and preferably from 0 to 30% by weight in a liquid composition containing the epoxy compound in the invention and preferably containing an oxetane ring-containing and/or a vinyl ether compound.

Examples of the vinyl ether compound contained in the ink-jet ink of the invention include di- or tri-vinyl ether compounds such as ethylene glycol divinyl ether, diethylene glycol divinyl ether, triethylene glycol divinyl ether, propylene glycol divinyl ether, dipropylene glycol divinyl ether, butane diol divinyl ether, hexane diol divinyl ether, cyclohexane dimethanol divinyl ether, and trimethylol propane trivinyl ether; and mono vinyl ether compounds such as ethylene glycol monovinyl ether, ethyl vinyl ether, n-butyl vinyl ether, iso-butyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

In these vinyl ether compounds, when the hardenability, adhesion or surface hardness is considered, di- or tri-vinyl ether compounds are preferable, and particularly divinyl ether compounds are preferable. In the present invention, these vinyl ether compounds may be used alone or as an admixture of two or more kinds thereof.

In the invention, the vinyl ether compound is a compound which may be added to the ink-jet ink of the invention. However, addition of the vinyl ether compound to the ink can lower viscosity of the ink, and can increase the curing rate of the ink. The content of the vinyl ether compound in the invention in the ink-jet ink of the invention is preferably from 0 to 40% by weight, and more preferably from 0 to 20% by weight.

Examples of the cationic photopolymerization initiator used in the invention include arylsulfonium derivatives (for example, Silacure UVI-6990 or Silacure UVI-6974 produced by Union Carbide Co., Ltd., or Adekaoptomer SP-150, Adekaoptomer SP-152, Adekaoptomer SP-170, or Adekaoptomer SP-172 produced by Asahi Denka Kogyo Co., Ltd.); aryliodonium derivatives (for example, RP-2074 produced by Rodia Co., Ltd.); Arene-ion complexes (for example, Irgacure. 261 produced by Ciba Geigy Co., Ltd.); diazonium salts; triazine type initiator; and other halogenides.

In the invention, a sulfonium salt is preferably used as a cationic photopolymerization initiator (photolytically acid generating agent). A sulfonium salt releasing no benzene on exposure of an actinic ray is especially preferred.

Herein, "a sulfonium salt releasing no benzene on exposure of an actinic ray" refers to a sulfonium salt which does not substantially release benzene on exposure of an actinic ray, and particularly a sulfonium salt such that when a 15 μm thick image with an area of 100 m$^2$ is formed employing ink containing the sulfonium salt in an amount of 5% by weight, and the resulting image is sufficiently exposed at 30° C. to actinic rays so as to completely decompose the sulfonium salt, a releasing amount of benzene is not more than 5 μg or zero.

The sulfonium salt is preferably a sulfonium salt represented by formula [1] through [4], and the sulfonium salt, which has a substituent on the benzene ring bonding the $^+$S satisfies the above mentioned definition.

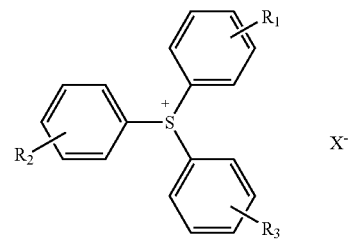

Formula [1]

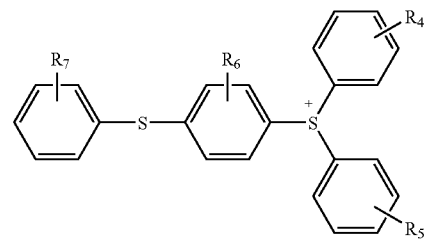

Formula [2]

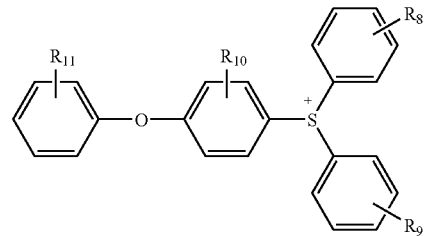

Formula [3]

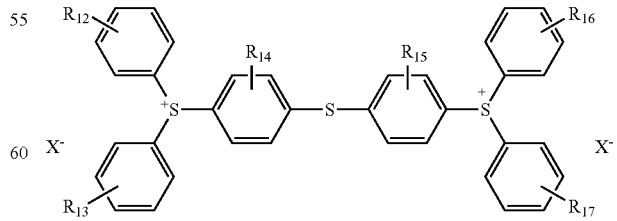

Formula [4]

In formulae [1] through [4] above, $R_1$ through $R_{17}$ independently represent a hydrogen atom or a substituent, provided that $R_1$ through $R_3$ are not simultaneously hydrogen atoms, $R_4$ through $R_7$ are not simultaneously hydrogen atoms, $R_8$ through $R_{11}$ are not simultaneously hydrogen atoms, and $R_{12}$ through $R_{17}$ are not simultaneously hydrogen atoms; and $X^-$ represents an anion.

In formulae [1] through [4] above, $R_1$ through $R_{17}$ independently represent a hydrogen atom or a substituent, provided that $R_1$ through $R_3$ are not simultaneously hydrogen atoms, $R_4$ through $R_7$ are not simultaneously hydrogen atoms, $R_8$ through $R_{11}$ are not simultaneously hydrogen atoms, and $R_{12}$ through $R_{17}$ are not simultaneously hydrogen atoms.

Examples of the substituent represented by $R_1$ through $R_{17}$ include an alkyl group such as a methyl group, an ethyl group, a propyl group, an isopropyl group, a butyl group, an isobutyl group, a t-butyl group, a pentyl group, or a hexyl group; an alkoxy group such as a methoxy group, an ethoxy group, a propoxy group, an isopropyl group, a butoxy group, a hexyloxy group, a decyloxy group or a dodecyloxy group; a carbonyl group such as an acetoxy group, a propionyloxy group, a decylcarbonyloxy group, a dodecylcarbonyloxy group, a methoxycarbonyl group, an ethoxycarbonyl group or a benzoyloxy group; a phenylthio group; a halogen atom such as fluorine, chlorine, bromine or iodine; a cyano group; a nitro group; and a hydroxyl group.

$X^-$ represents an anion. Examples thereof include a halogen ion such as $F^-$, $Cl^-$, $Br^-$ or $I^-$, $B(C_6F_5)_4^-$, $R_{18}COO^-$, $R_{19}SO_3^-$, $SbF_6^-$, $AsF_6^-$, $PF_6^-$, and $BF_4^-$, in which $R_{18}$ and $R_{19}$ independently represent an alkyl group such as a methyl group, an ethyl group, a propyl group or a butyl group; an alkyl group having, as a substituent, a halogen atom such as fluorine, chlorine, bromine or iodine, a nitro group, a cyano group, a methoxy group or an ethoxy group; or a phenyl group. Among these, $B(C_6F_5)_4^-$ and $PF_6^-$ are preferred in view of safety.

Exemplified compounds [5] through [13] of the sulfonium salt represented by formulae [1] through [4] will be shown below.

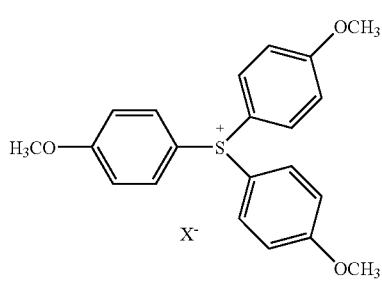

Formula [5]

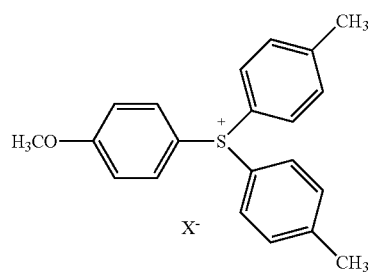

Formula [6]

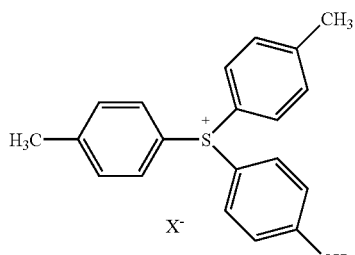

Formula [7]

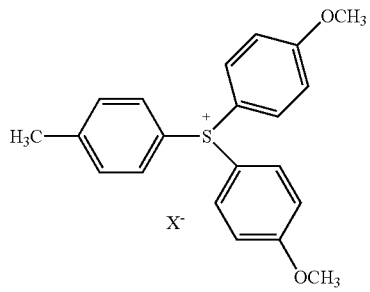

Formula [8]

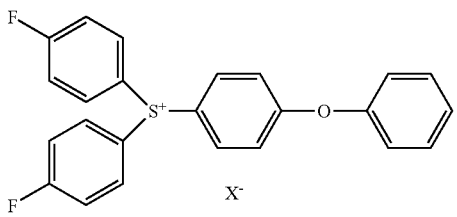

Formula [9]

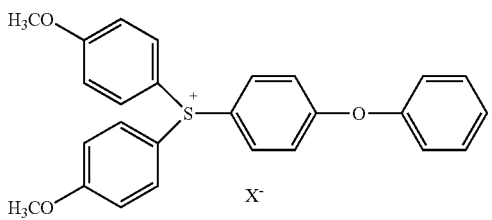

Formula [10]

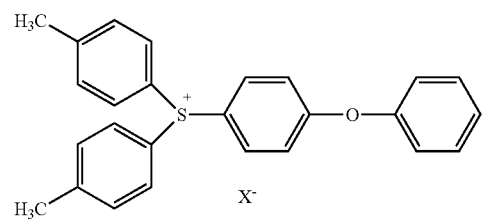

Formula [11]

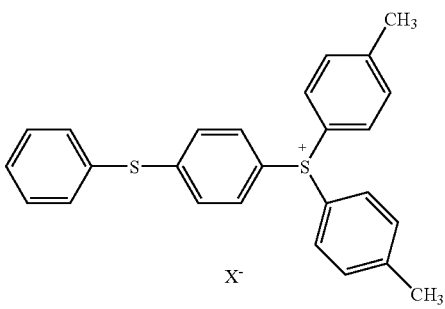

Formula [12]

-continued

Formula [13]

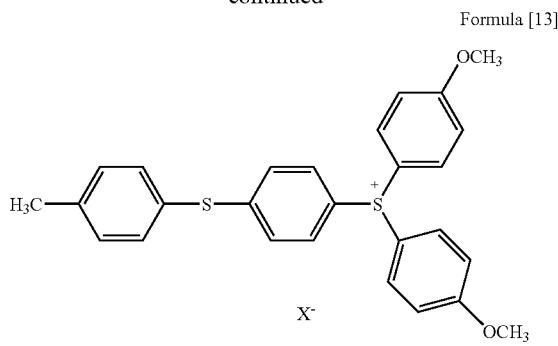

In formulae [5] through [13], X⁻ represents an anion, and examples thereof are the same as those denoted in X⁻ of formulae [1] through [4].

The above compounds can be easily synthesized according to commonly known methods, for example, in the same manner as the photolytically acid generating agent described in "THE CHEMICAL SOCIETY OF JAPAN", Vol. 71, No. 11 (1998), and "Imejinguyou Yukizairyo", edited by Yuki Erekutoronikus Zairyokenkyukai, and published by Bunshin Shuppan (1993).

In the invention, the sulfonium salt represented by formula [1], [2], [3] or [4] is preferably at least one selected from the sulfonium salts represented by formulae [5] through [13].

The cationic photopolymerization initiator content is preferably from 0.2 to 20 parts by weight of 100 parts by weight of cationically polymerizable compound. The content less than 0.2 parts by weight of the cationic photopolymerization initiator provides a poor hardening property, and the content exceeding 20 parts by weight of the cationic photopolymerization initiator does not exhibit a further hardening property. These cationic photopolymerization initiators may be used singly or as a mixture of two or more kinds thereof.

Examples of a photopolymerization promoting agent include anthracene; and anthracene derivatives (for example, Adekaoptomer SP-100 produced by Asahi Denka Kogyo Co., Ltd.). These photopolymerization promoting agents may be used singly or as a mixture of two or more kinds thereof.

Examples of the pigment dispersant include carboxylic acid esters containing a hydroxyl group, salts of long chain polyaminoamides with high molecular weight acid esters, high molecular weight polycarboxylic acid salts, salts of long chain polyaminoamides with polar acid esters, high molecular weight unsaturated acid esters, high molecular copolymers, modified polyurethanes, modified polyacrylates, polyether ester type anion based surfactants, a salt of a naphthalenesulfonic acid formalin condensation product, a salt of an aromatic sulfonic acid formalin condensation product, polyoxyethylene alkylphosphoric acid esters, polyoxyethylene nonyl phenyl ether, stearylamine acetate, and pigment derivatives.

Typical examples of the pigment dispersants include "Anti-Terra-U (a polyaminoamide phosphoric acid salt)", "Anti-Terra-203/204 (a high molecular weight polycarboxylic acid salt)", "Disperbyk-101 (polyaminoamide phosphoric acid salt and acid ester), 107 (a hydroxyl group containing carboxylic acid ester), 110 (an acid group containing copolymer), 130 (polyamide), 161, 162, 163, 164, 165, 166, and 170 (high molecular copolymer)", "400", "Bykumen" (a high molecular weight unsaturated acid ester), "BYK-P104, P105 (high molecular weight unsaturated polycarboxylic acid)" "P104S, 240S (high molecular weight unsaturated acid polycarboxylic acid and silicon based), and "Lactimon (long chain amine, unsaturated acid polycarboxylic acid, and silicon)", manufactured by BYK Chemie Co.

Further, listed are "Efka 44, 46, 47, 48, 49, 54, 63, 64, 65, 66, 71, 701, 764, and 766", "Efka Polymer 100 (modified polyacrylate), 150 (an aliphatic modified polymer), 400, 401, 402, 403, 450, 451, 452, and 453 (modified polyacrylates), 745 (being copper phthalocyanine based)", manufactured by Efka Chemicals Co., and "Flowlen TG-710 (urethane oligomer)", "Flownon SH-290, SP-1000", "Polyflow No. 50E, and No. 300 (an acryl based copolymer)", manufactured by Kyoei Kagaku Co., "Disparlon KS-860, 873SN, and 874 (a polymer dispersing agent), #2150 (aliphatic multivalent carboxylic acid), and #7004 (polyether ester type)", manufactured by Kusumoto Kasei Co.

Further, listed are "Demol RN and N (both are naphthelenesulfonic acid formalin condensation product sodium salts), MS, C, and SN—B (all are aromatic sulfonic acid formalin condensation product sodium salts), and EP", "Homogenol L-18 (a polycarboxylic acid type polymer)", "Emulgen 920, 930, 931, 935, 950, and 985 (all are polyoxyethylene nonyl phenyl ethers)", and "Acetamin 24 (coconut amine acetate) and 86 (stearylamine acetate)", manufactured by Kao Corp., "Solsperse 5000 (phthalocyanine ammonium salt based), 13240 and 13940 (both are polyesteramine based), 17000 (being fatty acid amine based), 24000, 28000, and 32000", manufactured by Zeneca Corp., "Nikkol T106 (polyoxyethylene sorbitan monooleate), MYS-IEX (polyoxyethylene monostearate), and Hexagline 4-0 (hexaglyceryl tetraoleate)", manufactured by Nikko Chemical Co., Ltd.

The pigment dispersant content of ink is preferably from 0.1 to 10% percent by weight.

The ink-jet ink of the invention can be prepared by dispersing pigment, an actinic ray curable compound and a pigment dispersant in a conventional disperser such as a sand mill. It is preferred that a solution containing a high concentration of pigment prepared in advance is diluted with an actinic ray curable compound. A conventional disperser can be used. Therefore, neither excessive dispersion energy nor much dispersion time is necessary, and ink with excellent stability is obtained without causing deterioration of the ink components. It is preferred that the dispersed ink composition is filtered with a filter with a pore diameter of not more than 3 µm, and then with a filter with a pore diameter of not more than 1 µm.

The ink-jet ink of the invention has a viscosity at 25° C. of preferably from 5 to 50 Pa·s. Ink having a viscosity at 25° C. of from 5 to 50 Pa·s is stably ejected not only from a recording head with a normal frequency of 4 to 10 KHz but also from a recording head with a high frequency of 10 to 50 KHz. Ink having a viscosity at 25° C. of less than 5 Pa·s lowers a following property of ink ejection from a recording head with a high frequency, and ink having a viscosity at 25° C. exceeding 50 Pa·s lowers ink ejection stability, resulting in incapability of ejection, even if a recording head is provided with a viscosity decreasing mechanism for lowering ink viscosity such as a heater.

It is preferred that the ink-jet ink of the invention used in a piezo type recording head be adjusted to an electroconductivity of not more than 10 µS/cm so that the inside of the head is not corroded by ink the composition. It is preferred that the electroconductivity of the ink composition used in a continuous type recording head be adjusted by an electrolyte to not less than 0.5 mS/cm.

As resins for a recording medium used in the invention, conventional synthetic resins widely used for various use can be used. Examples of the resins include polyester, polyethylene, polyurethane, polypropylene, acryl resin, polycarbonate, polystyrene, acrylonitrile-butadiene-styrene copolymer, polyethylene terephthalate, and polybutadiene terephthalate. Thickness or form of the recording medium comprised of these resins is not specifically limited.

Usage of the ink-jet ink of the invention is as follows: The ink-jet ink is incorporated in a recording head of an ink jet printer, ejected from the recording head onto a recording medium, and exposing the ejected ink on the recording medium to actinic rays such as ultraviolet light and an electron beam, whereby the ink on the recording medium is rapidly cured.

Examples of a light source for actinic ray include a mercury arc lamp, a xenon arc lamp, a fluorescent lamp, a carbon arc lamp, a tungsten-halogen lamp, and sunlight. When electron beam is used for actinic ray, the ink is ordinarily cured employing an electron beam having energy of not more than 300 eV, but can be instantly cured instantly by irradiation of 1 to 5 Mrad.

EXAMPLES

The invention will now be explained employing examples, however, the embodiments of the invention are not limited thereto.

<<Preparation of Inventive Ink Samples 1 Through 6>>

A mixture of pigment, a pigment dispersant, an epoxy compound, an oxetane compound, and a vinyl ether compound as shown in Table 1 was dispersed in a sand mill for 4 hours to obtain an actinic ray curable ink liquid. Thereafter, the resulting ink liquid was mildly mixed with a cationic photopolymerization initiator as shown in Table 1, and filtered under pressure employing a membrane filter to obtain an actinic ray curable ink-jet ink. Thus, inventive ink samples 1 through 6 were obtained.

TABLE 1

| Inventive ink sample No. | | 1 | 2 | 3 | 4 | 5 | 6 | Remarks |
|---|---|---|---|---|---|---|---|---|
| Pigment | P1 (weight parts) | 5 | 5 | 5 | 5 | 5 | 5 | |
| Epoxy compound in the invention | E1 (weight parts) | 20 | | | | | | MW: 324 |
| | E3 (weight parts) | | 30 | | | | | MW: 352 |
| | E2 (weight parts) | | | 30 | | | | MW: 507 |
| | E4 (weight parts) | | | | 30 | | | MW: 380 |
| | E5 (weight parts) | | | | | 20 | | MW: 376 |
| | E6 (weight parts) | | | | | | 20 | MW: 396 |
| Oxetane compound | OXT221 (weight parts) | 70 | 70 | 70 | 70 | 70 | 70 | |
| Oxirane compound | CEL2000 (weight parts) | | | | | 10 | | |
| Vinyl ether compound | DVE-3 (weight parts) | 10 | | | | | 10 | |
| Pigment dispersant | 32000 (weight parts) | 3 | 3 | 3 | 3 | 3 | 3 | |

TABLE 1-continued

| Inventive ink sample No. | | 1 | 2 | 3 | 4 | 5 | 6 | Remarks |
|---|---|---|---|---|---|---|---|---|
| Cationic photopoly- merization initiator | SP-1 (weight parts) | 10 | 10 | | | | | |
| | SP-2 (weight parts) | | | 10 | 10 | | | |
| | SP-3 (weight parts) | | | | | 10 | 10 | |

MW: Molecular weight

Details of the components described in Table 1 are as follows:

Pigment

P1: Crude copper phthalocyanine ("Copper phthalocyanine" produced by Toyo Ink Manufacturing Co., Ltd.) of 250 parts, 2500 parts of sodium chloride, and 160 parts of polyethylene glycol (Polyethylene glycol 300 produced by Tokyo Kasei Co., Ltd.) were placed in a 4.55 liter (1 gallon) polystyrene kneader (produced by Inoue Seisakusho o., Ltd.) and kneaded for 3 hours. The resulting mixture was poured into a 2.5 liter hot water, and stirred in a high speed mixer at about 80° C. for about one hour to obtain a slurry. The resulting slurry was filtered off, washed with water 5 times to eliminate the sodium chloride and the solvent, and dried employing a spray drying method. Thus, Pigment P1 was obtained.

Oxetane Compound:

OXT221: Oxetane compound (produced by Toa Gosei Co., Ltd.)

Oxirane Compound:

CEL2000: 3-Vinyl-7-oxa-bicyclo[4.1.0]heptane (produced by Daicel Kagaku Co., Ltd.)

Vinyl Ether Compound:

DVE-3: Triethylene glycol divinyl ether (produced by ISP Co., Ltd.)

Pigment Dispersant:

32000: Aliphatic group modified compound ("Solsperse 32000" (produced by Zeneca Co., Ltd.)

Cationic Photopolymerization Initiator:

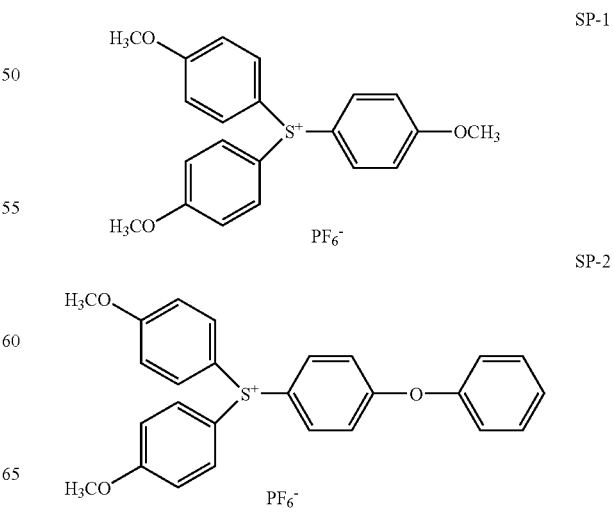

-continued

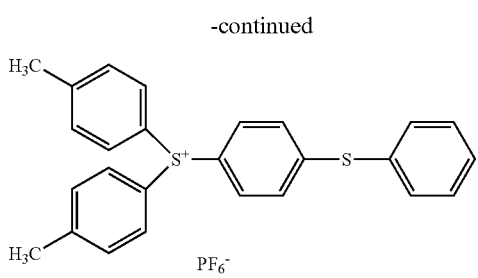

SP-3

[Preparation of Comparative Ink Sample 1]

Comparative ink sample 1 was prepared in the same manner as inventive ink sample 1 above, except that 20 parts by weight of Celloxide 2021P (alicyclic epoxide, molecular weight: 252, produced by Daicel Kagaku Co., Ltd.) were used instead of the epoxy compound EP-1 in the invention.

The chemical structure of Celloxide 2021P is as follows:

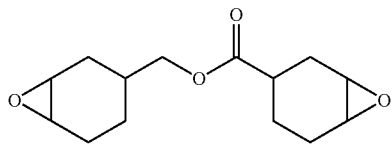

With respect to inventive ink samples 1 through 6 and comparative ink sample 1 obtained above, and printed matter obtained employing them, the following evaluations were carried out.

Preparation of Printed Matter

The ink samples obtained above were ejected onto a polyethylene terephthalate recording sheet employing an ink jet printer with a piezo type recording head, and then the ink on the recording sheet was cured employing a UV light source (with 8 cold-cathode tubes: 20 W output power), while the recording sheet was transported. Thus, printed matter with a cured ink image layer was obtained.

Curability:

Curability was represented by a transporting rate (mm/second) of the recording sheet in the above preparation of printed matter at which tackiness of the printed ink was not perceived by fingering. A higher transporting rate provides better curability.

Stability (Epoxy Compound):

An epoxy compound after stored at 100° C. for one month was observed and its viscosity was determined, and evaluated according to the following criteria:
A: No viscosity variation was observed.
B: An increase in viscosity was observed.
C: Gelled matter was observed.

Stability (Ink):

Ink after stored at 100° C. for one month was observed and its viscosity was determined, and evaluated according to the following criteria:
A: Neither precipitation production nor viscosity variation was observed.
B: No precipitation production was observed, but an increase in viscosity was observed.
C: Precipitation production was observed.

Stability (Ink Ejection):

After 30 minutes' continuous ink ejection was carried out, ink clogging of nozzles was observed and evaluated according to the following criteria:
A: After 30 minutes' continuous ink ejection, no clogging of nozzles was observed.
B: After 30 minutes' continuous ink ejection, no clogging of nozzles was observed, but satellite observed.
C: After 30 minutes' continuous ink ejection, clogging of nozzles was observed.

Safety (Epoxy Compound):

Irritation of the epoxy compound adhered to the skin was evaluated according to the following criteria:
A: No variation was observed on the skin.
B: The skin was colored red.
C: Blisters were produced on the skin.

Safety (Ink):

Irritation of the ink adhered to the skin was evaluated according to the following criteria:
A: No variation was observed on the skin.
B: The skin was colored red.
C: Blisters were produced on the skin.

Strength of Cured Ink Image Layer of Printed Matter Above):

A scratch test was carried out, in which the cured ink image layer cured at 25° C. and 45% RH was scratched with fingernails, and the strength of the cured ink image layer was evaluated according to the following criteria:
A: No ink image layer was peeled off by fingernail scratching.
B: A part of the ink image layer was peeled off by vigorous fingernail scratching.
C: The ink image layer was easily peeled off by fingernail scratching.

Adhesion Property:

A cross-cut adhesion test was carried out according to a method as described in JIS K5400. Eleven cut lines at an interval of 1 mm were formed in the transverse and longitudinal directions on the images of the printed matter obtained above, to form a grid of one hundred 1 mm² squares. Cellophane tape (R) was adhered to the formed grid and sharply peeled off perpendicularly to the surface (cross-cut adhesion test).

Similarly, cellophane tape (R) was adhered to the images of the printed matter without cut lines, and sharply peeled off perpendicularly to the surface (simple adhesion test). Before the above tests, the images had been cured at 25° C. and 45% RH.

Evaluation was carried out according to the following criteria:
A: No peeling of the image was observed at the cross-cut adhesion test.
B: Some peeling of the image was observed at the cross-cut adhesion test, but no peeling of the image was observed at the simple adhesion test of uncut images.
C: Peeling of the image was observed at both adhesion tests above.

Solvent Resistance and Water Resistance:

An image was printed on a recording medium employing each of the ink samples to obtain printed matter. After the resulting printed matter was immersed in 50° C. alcohol or in 50° C. water for 10 seconds, breakage and shrinkage of the printed image were observed and evaluated according to the following criteria:

A: No change was observed.
B: Slight breakage and shrinkage were observed.
C: Obvious breakage and shrinkage were observed.
The results are shown in Table 2.

TABLE 2

| Ink sample No. | Curability (mm/second) 25° C., 45% RH | Curability (mm/second) 25° C., 85% RH | Curability (mm/second) 35° C., 85% RH | Stability Epoxy compound | Stability Ink | Stability Ejection | Safety Epoxy compound | Safety Ink | Strength of ink layer | Adhesion property | Solvent resistance | Water resistance |
|---|---|---|---|---|---|---|---|---|---|---|---|---|
| 1 (Inv.) | 500 | 500 | 250 | A | A | A | A | A | A | A | A | A |
| 2 (Inv.) | 500 | 500 | 250 | A | A | A | A | A | A | A | A | A |
| 3 (Inv.) | 500 | 500 | 250 | A | A | A | A | A | A | A | A | A |
| 4 (Inv.) | 500 | 500 | 250 | A | A | A | A | A | A | A | A | A |
| 5 (Inv.) | 500 | 500 | 250 | A | A | A | A | A | A | A | A | A |
| 6 (Inv.) | 500 | 500 | 250 | A | A | A | A | A | A | A | A | A |
| 1 (Comp.) | 500 | 100 | 1050 | B | C | C | C | C | C | C | C | B |

Inv.: Invention, Comp.: Comparative

As is apparent from Table 2, the epoxy compound in the invention provides good stability and high safety, and the inventive ink samples provide good stability, high safety, good curability, high strength of a cured ink layer, excellent stability of ejection from nozzles, good adhesion to a recording medium, good solvent resistance and good water resistance, as compared with the comparative ink samples.

EFFECTS OF THE INVENTION

The present invention can provide an actinic ray curable ink-jet ink providing high safety, good stability, excellent photopolymerization properties under high humidity, good curability, high strength of the cured ink layer, excellent stability of ejection from nozzles, good adhesion to a substrate, good solvent resistance, and good water resistance, to provide printed matter prepared by employing the actinic ray curable ink-jet ink, to provide an epoxy compound with high safety and good stability, and to provide an actinic ray curable composition containing the epoxy compound.

What is claimed is:

1. An actinic ray curable ink-jet ink comprising an alicyclic epoxy compound represented by the following formula (VI) or (VII),

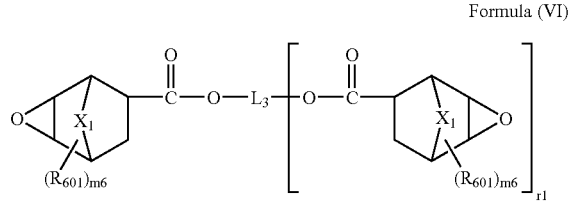

Formula (VI)

wherein $R_{601}$ represents an aliphatic group which is positioned at the position other than the α or β-position of the oxirane rings; m6 represents an integer of from 0 to 2; $X_1$ represents $—(CH_2)_{n6}—$ or $—(O)_{n6}$, in which n6 represents an integer of 0 or 1; r1 represents an integer of from 1 to 3; and $L_3$ represents a (r1+1)-valent linkage group having a branched structure, provided that the linkage group may contain an oxygen atom or a sulfur atom in the main chain,

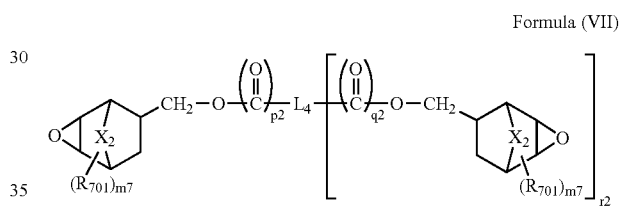

Formula (VII)

wherein $R_{701}$ represents an aliphatic group which is positioned at the position other than the α or β-position of the oxirane rings; m7 represents an integer of from 0 to 2; $X_2$ represents $—(CH_2)_{n7}—$ or $—(O)_{n7}—$, in which n7 represents an integer of 0 or 1; r2 represents an integer of from 1 to 3; $L_4$ represents a (r2+1)-valent linkage group having a branched structure, provided that the linkage group may contain an oxygen atom or a sulfur atom in the main chain; and p2 and q2 independently represent an integer of 1 or 2.

2. The actinic ray curable ink-jet ink of claim 1, wherein the epoxy compound has a molecular weight of from 170 to 1,000.

3. The actinic ray curable ink-jet ink of claim 1, further comprising an oxetane ring-containing compound or a vinyl ether compound.

4. The actinic ray curable ink-jet ink of claim 1, further comprising a cationic photopolymerization initiator.

5. The actinic ray curable ink-jet ink of claim 1, further comprising pigment.

6. The actinic ray curable ink-jet ink of claim 5, further comprising a pigment dispersant.

7. The actinic ray curable ink-jet ink of claim 5, wherein the pigment has an average particle size of from 10 to 150 nm.

8. The actinic ray curable ink-jet ink of claim 1, wherein the ink has a viscosity at 25° C. of from 5 to 50 Pa·s.

9. A printed matter, prepared by supplying the actinic ray curable ink-jet of claim 1 onto a recording medium.

* * * * *